United States Patent
Schwarz et al.

(10) Patent No.: US 12,242,120 B2
(45) Date of Patent: Mar. 4, 2025

(54) OPTOELECTRONIC MODULE, OPTOELECTRONIC PLUG CONNECTOR AND OPTOELECTRONIC SUB-DISTRIBUTION UNIT

(71) Applicant: HARTING Electronics GmbH, Espelkamp (DE)

(72) Inventors: Andreas Schwarz, Bünde (DE); Rainer Bussmann, Bad Essen (DE); Marc Genau, Lübbecke (DE)

(73) Assignee: HARTING Electronics GmbH, Espelkamp (DE)

( * ) Notice: Subject to any disclaimer, the term of this patent is extended or adjusted under 35 U.S.C. 154(b) by 118 days.

(21) Appl. No.: 18/019,836

(22) PCT Filed: Aug. 19, 2021

(86) PCT No.: PCT/DE2021/100701
§ 371 (c)(1),
(2) Date: Feb. 6, 2023

(87) PCT Pub. No.: WO2022/053104
PCT Pub. Date: Mar. 17, 2022

(65) Prior Publication Data
US 2023/0280552 A1    Sep. 7, 2023

(30) Foreign Application Priority Data
Sep. 9, 2020 (DE) ...................... 10 2020 123 465.1

(51) Int. Cl.
*H04B 10/00* (2013.01)
*G02B 6/42* (2006.01)

(52) U.S. Cl.
CPC ............. *G02B 6/426* (2013.01); *G02B 6/428* (2013.01)

(58) Field of Classification Search
CPC ...... G02B 6/426; G02B 6/428; G02B 6/4246; G02B 6/4249; G02B 6/4242;
(Continued)

(56) References Cited

U.S. PATENT DOCUMENTS 4,539,476 A * 9/1985 Donuma .............. G02B 6/4292
250/227.24
4,678,264 A * 7/1987 Bowen ................. G02B 6/4292
385/88
(Continued)

FOREIGN PATENT DOCUMENTS

| DE | 202017100608 U1 | 2/2017 |
|---|---|---|
| EP | 1180704 A2 | 2/2002 |
| JP | 2007256556 A | 10/2007 |

*Primary Examiner* — Agustin Bello
(74) *Attorney, Agent, or Firm* — Smartpat PLC

(57) ABSTRACT

In order to simplify mounting and cabling of optoelectronic plug connectors (3, 3') and—equipped therewith—subdistribution units (6) and subdistribution systems, the use of special module housings (100) is proposed. The latter can accommodate a plurality of, in particular eight, identical and/or different optoelectronic transducers (2, 2') and are installed in the plug connectors (3, 3') between the electrical plug contacts (311) and the multi-core optical cables (58), i.e. the cores (51) thereof. Susceptibility to errors is considerably improved as a result and mounting is significantly simplified as a result of the improved clarity.

17 Claims, 7 Drawing Sheets

(58) Field of Classification Search
CPC .. G02B 6/4243; G02B 6/4245; G02B 6/4262; G02B 6/4284
See application file for complete search history.

(56) References Cited

U.S. PATENT DOCUMENTS

| | | | | |
|---|---|---|---|---|
| 4,737,008 | A * | 4/1988 | Ohyama | G02B 6/4206 385/88 |
| 4,840,451 | A * | 6/1989 | Sampson | G02B 6/4292 385/88 |
| 4,993,803 | A * | 2/1991 | Suverison | G02B 6/3817 439/577 |
| 5,005,939 | A * | 4/1991 | Arvanitakis | G02B 6/4292 385/53 |
| 5,071,219 | A * | 12/1991 | Yurtin | G02B 6/3893 385/89 |
| 5,127,071 | A * | 6/1992 | Go | B29C 70/68 385/73 |
| 5,134,679 | A * | 7/1992 | Robin | G02B 6/4284 385/79 |
| 5,231,685 | A * | 7/1993 | Hanzawa | G02B 6/4292 385/139 |
| 5,233,676 | A * | 8/1993 | Yonemura | H01L 31/0203 257/E31.117 |
| 5,259,053 | A * | 11/1993 | Schaffer | G02B 6/4292 385/52 |
| 5,305,408 | A * | 4/1994 | Schaffer | G02B 6/4246 385/92 |
| 5,337,398 | A * | 8/1994 | Benzoni | G02B 6/4246 385/52 |
| 5,341,446 | A * | 8/1994 | Shibata | G02B 6/3893 385/86 |
| 5,361,318 | A * | 11/1994 | Go | G02B 6/4253 385/88 |
| 5,432,340 | A * | 7/1995 | Shibata | G02B 6/4292 250/239 |
| 5,452,388 | A * | 9/1995 | Rittle | G02B 6/3879 385/92 |
| 5,475,783 | A * | 12/1995 | Kurashima | G02B 6/4292 385/94 |
| 5,596,665 | A * | 1/1997 | Kurashima | G02B 6/4274 385/94 |
| 5,671,311 | A * | 9/1997 | Stillie | G02B 6/4261 385/60 |
| 5,742,480 | A * | 4/1998 | Sawada | G02B 6/4281 174/254 |
| 5,963,693 | A * | 10/1999 | Mizue | G02B 6/4246 385/94 |
| 6,113,280 | A * | 9/2000 | Nagaoka | G02B 6/4246 385/94 |
| 6,217,230 | B1 * | 4/2001 | Matsushita | G02B 6/3869 385/78 |
| 6,239,427 | B1 * | 5/2001 | Mizue | G02B 6/4292 385/94 |
| 6,296,399 | B1 * | 10/2001 | Halbach | G02B 6/3893 385/139 |
| 6,341,898 | B1 * | 1/2002 | Matsushita | G02B 6/4245 385/94 |
| 6,341,899 | B1 * | 1/2002 | Shirakawa | G02B 6/389 439/541.5 |
| 6,357,931 | B1 * | 3/2002 | Shirakawa | G02B 6/4293 385/75 |
| 6,424,758 | B1 * | 7/2002 | Cheng | G02B 6/4292 439/911 |
| 6,450,703 | B1 * | 9/2002 | Shirakawa | G02B 6/4292 385/88 |
| 6,491,443 | B1 * | 12/2002 | Serizawa | G02B 6/4204 385/33 |
| 6,499,889 | B1 * | 12/2002 | Shirakawa | G02B 6/3869 385/88 |
| 6,500,026 | B2 * | 12/2002 | Yamaguchi | G02B 6/3817 439/577 |
| 6,547,446 | B2 * | 4/2003 | Yamaguchi | G02B 6/3817 439/577 |
| 6,558,045 | B2 * | 5/2003 | Yamaguchi | G02B 6/3817 439/577 |
| 6,652,154 | B2 * | 11/2003 | Shirakawa | G02B 6/4292 385/72 |
| 6,739,765 | B1 * | 5/2004 | Liu | G02B 6/4292 385/88 |
| 6,793,412 | B2 * | 9/2004 | Nishita | G02B 6/4292 385/88 |
| 6,817,775 | B2 * | 11/2004 | Nakura | G02B 6/4277 385/53 |
| 6,860,643 | B2 * | 3/2005 | Nakura | G02B 6/4277 385/63 |
| 6,939,054 | B2 * | 9/2005 | Nakura | G02B 6/4245 385/53 |
| 7,090,410 | B2 * | 8/2006 | Kambe | G02B 6/4246 385/88 |
| 7,128,475 | B2 * | 10/2006 | Kesler | G02B 6/4292 385/88 |
| 7,261,470 | B2 * | 8/2007 | Miyao | G02B 6/4292 439/567 |
| 7,553,090 | B2 * | 6/2009 | Schempp | G02B 6/421 385/92 |
| 7,597,485 | B2 * | 10/2009 | Moriarty | G02B 6/4277 385/76 |
| 7,628,546 | B2 * | 12/2009 | Mine | G02B 6/4204 385/76 |
| 7,665,907 | B2 * | 2/2010 | Schempp | G02B 6/421 385/88 |
| 7,845,861 | B2 * | 12/2010 | Ozaki | G02B 6/4219 398/139 |
| 8,033,739 | B2 * | 10/2011 | Wang | G02B 6/4201 385/88 |
| 8,616,787 | B2 * | 12/2013 | Matsuo | H01L 31/0203 385/92 |
| 8,672,561 | B2 * | 3/2014 | Tootoonian | G02B 6/4262 385/76 |
| 8,702,325 | B2 * | 4/2014 | Wu | G02B 6/3817 385/88 |
| 8,740,478 | B2 * | 6/2014 | Weberpals | G02B 6/4292 385/94 |
| 9,285,549 | B2 * | 3/2016 | Doyle | G02B 6/3858 |
| 11,467,347 | B2 * | 10/2022 | Murray | G02B 6/4453 |
| 2002/0002003 | A1 * | 1/2002 | Yamaguchi | G02B 6/3817 439/79 |
| 2002/0021873 | A1 | 2/2002 | Patzelt | |
| 2002/0048434 | A1 * | 4/2002 | Asada | G02B 6/3888 385/88 |
| 2002/0102073 | A1 * | 8/2002 | Shirakawa | G02B 6/4292 385/92 |
| 2002/0141706 | A1 * | 10/2002 | Nakura | G02B 6/4269 385/88 |
| 2011/0299815 | A1 * | 12/2011 | Tootoonian | G02B 6/4243 385/83 |
| 2012/0243837 | A1 * | 9/2012 | Ko | H01R 12/724 385/92 |
| 2012/0270434 | A1 * | 10/2012 | Fabian | H01R 13/518 439/460 |
| 2013/0183011 | A1 * | 7/2013 | Weberpals | G02B 6/4292 385/94 |
| 2018/0287280 | A1 * | 10/2018 | Ratkovic | H01R 12/62 |
| 2023/0280552 | A1 * | 9/2023 | Schwarz | G02B 6/426 385/89 |

* cited by examiner

OPTOELECTRONIC MODULE, OPTOELECTRONIC PLUG CONNECTOR AND OPTOELECTRONIC SUB-DISTRIBUTION UNIT

TECHNICAL FIELD

The disclosure relates to an optoelectronic module, to an optoelectronic connector having at least two optoelectronic modules, and to an optoelectronic sub-distribution arrangement having a central optoelectronic connector and a plurality of peripheral connectors, which each have at least one optoelectronic module.

Such modules, connectors and sub-distribution arrangements are needed to install and to operate complex signal distribution arrangements in an error- and interference-free manner.

BACKGROUND

Optoelectronic transducers, namely so-called transceivers (Tx) and receivers (Rx), and connectors combined with such optoelectronic transducers are known from the prior art.

EP 1 180 704 A2 relates to a plug and a system for the electrical connection of sub-racks in the field of switching technology. In this case, at least one optical transmission cable can be connected to the plug. An optoelectronic transducer is accommodated in the housing of the plug itself. Moreover, an optoelectronic transducer is in contact with the printed circuit board via plug contacts, which are either plugged into or soldered onto the printed circuit board. Plug contacts, to which the optical signal cables are connected, are likewise located on the plug-in side. At least one of the plug contacts here serves to supply voltage to active components in the plug. In particular, the optoelectronic transducer is supplied with electrical energy via the plug contact.

Printed document DE 20 2017 100 608 criticizes the above-mentioned design for the fact that contact is made outside the connector housing on the one hand and for the low number of optical fibers which can be connected to a unit and furthermore for the undesirably high spatial requirement on the other. Building on this, the said document proposes a connector which has a printed circuit board and at least one optoelectronic transducer. The transducer is accommodated in a transducer housing and arranged on the printed circuit board and is connected to this printed circuit board in an electrically conductive manner. The optical fiber can be accommodated in the transducer housing.

This prior art is disadvantageous in that optoelectronic connectors and, in particular, optoelectronic sub-distribution arrangements having such connectors often require undesirable manufacturing and/or installation effort. The mounting, assignation and wiring of the electro-optical modules on a printed circuit board inside the connector is complex. It has furthermore been shown that there is significant demand on the part of customers to be able to optionally use optoelectronic transducers from different manufacturers, with these naturally varying in terms of the geometrical dimensions of their transducer housings. Furthermore, in particular in the rail sector, there is significant demand for flexibly adaptable optoelectronic wiring, in particular of central sub-distribution arrangements.

The German Patent and Trademark Office has searched the following prior art in the priority application relating to the present application: DE 20 2017 100 608 U1, EP 1 180 704 A2 and US 2002/0141706 A1.

SUMMARY

An object of the disclosure is to design an optoelectronic module, an optoelectronic connector and an optoelectronic sub-distribution arrangement for which the manufacturing, mounting, configuration and/or installation effort is as low as possible and which can, at the same time, be adapted as flexibly as possible to individual customer requirements.

The object is achieved by the subject matter of the independent claims.

An optoelectronic module has a module housing and multiple, in particular eight, optoelectronic transducers. These transducers have the following:
- a transducer housing having
  - internal transducer electronics arranged therein as well as multiple
  - electrical connections, which are connected to the transducer electronics in an electrically conductive manner and project out of the transducer housing, and
  - an optical connection, which is arranged in the transducer housing and may receive and/or emit light through a window in a housing wall of the transducer housing.

The module housing serves, on the one hand, to accommodate the optoelectronic transducers and collectively fasten them on a printed circuit board. On the other hand, the module housing serves to connect optical conductors, i.e. individual conductors of multi-conductor optical cables, in particular fiber-optic cables (FOC), to the optical connections of the transducers and to relieve the strain on the said optical conductors. In particular, a multi-conductor optical cable may have eight optical conductors (i.e. individual optical conductors).

The module housing is constructed in at least two parts and has a housing lower part and a housing upper part which can be connected and secured, in particular latched, to the housing lower part.

A respective transducer chamber for each optoelectronic transducer to be accommodated in the module housing is arranged in the housing lower part so as to accommodate the respective optoelectronic transducer therein in a form-fitting manner.

In particular, a transducer cutout for each optoelectronic transducer may be arranged in the housing upper part. By joining the housing upper part to the housing lower part, the transducer cutout comes to lie above the transducer chamber. The transducers may thus be held in their respective transducer chambers in a form-fitting manner in every direction. In particular, the module housing may have eight transducer chambers and transducer cutouts.

The transducer chamber of the housing lower part is designed to be open at its end which is provided for fastening on the printed circuit board or it has one or more contact lead-through openings at this end in order for the electrical connections of the optoelectronic transducer to pass through and make electrical contact with the printed circuit board.

The housing lower part and the housing upper part each have a respective contact surface. When the housing lower part and housing upper part are joined together, these two contact surfaces meet one another—in particular come to lie against one another—and are therefore defined as common contact surfaces. At these common contact surfaces, for each transducer chamber, the housing upper part and the housing lower part each have part of a cable channel leading to the transducer chamber, i.e. an upper part of the cable channel and a lower part of the cable channel, whereby the complete cable channel is formed in each case after the housing upper part and housing lower part have been joined together. The cable channel is therefore designed for feeding the optical conductors to the transducer chambers and therefore to the optoelectronic transducers arranged in each case therein.

Advantageous configurations of the invention are specified in the subclaims and in the description below.

In a preferred configuration, the housing upper part has a cable securing cutout for each cable channel, which is connected to the respective cable channel—more precisely to the upper part of the respective cable channel—and into which a securing element can be inserted in each case in order to ensure that the respective optical conductor is secured on the module housing with strain relief.

The housing lower part and the housing upper part of the module housing can preferably be fastened to one another by latching, screwing, adhesion, crimping, casting, hot pressing, riveting, extrusion and/or form-fitting insertion. In this regard, latching, screwing and insertion have the advantage of being reversible, i.e. the connection may be separated without damage, in order to replace a transducer, for example. Latching is less labor-intensive and enables the upper and lower part to be joined in the axial direction of the optoelectronic transducers, whereby they can be secured in their transducer chambers in a particularly simple manner, and is therefore particularly advantageous.

In a preferred configuration, the housing lower part and the housing upper part each have a step. The housing lower part has an inner step and the housing upper part has an outer step. This advantageously serves to increase the packing density and to simplify the insertion of the optical conductors.

A first group of cable channels may then be arranged in a first plane, and a second proportion of the cable channels may be arranged in a second plane. As a result of the step, the first plane may be arranged offset from the second plane here by at least the thickness of the cable channel.

This has the advantage that one group of optical conductors may be inserted into the module housing in the first plane and a second group of optical conductors may be inserted into the module housing in the second plane, whereby the packing density is increased. Moreover, the manual insertion of the conductors into the respective cable channel is thus facilitated.

As already mentioned, the optoelectronic transducers each have a transducer housing with internal transducer electronics arranged therein, as well as the above-mentioned electrical connections protecting out of the housing, which may be designed as connection pins, for example. They furthermore have the said optical connection, which is arranged in the transducer housing and may receive and/or emit light through the window in a housing wall. The optical conductors of the optical cable can then be fed to this optical connection via the cable channel of the module housing. However, as already mentioned, the electrical connections of the transducers may be connected, in particular soldered, to traces of the printed circuit board in an electrically conductive manner.

According to their internal transducer electronics, a proportion the optoelectronic transducers may be transceivers (Tx), i.e. they receive electrical signals and convert them into an optical signal, e.g. via an LED (light emission diode).

According to their internal transducer electronics, another proportion of the optoelectronic transducers may be receivers (Rx), i.e. they receive an optical signal and convert it into an electrical signal.

In a preferred configuration, all optoelectronic transducers have the same housing dimensions.

In another configuration, at least two of the optoelectronic transducers have different housing dimensions, i.e. their transducer housings deviate from one another in terms of their form, e.g. because they come from different manufacturers.

In a preferred configuration, the module housing is capable of accommodating the optoelectronic transducers with the above-mentioned different housing dimensions in its transducer chambers. As already mentioned, these different optoelectronic transducers may come from different manufacturers and may be selected by customers on the basis of determining criteria such as price and/or quality and/or further specific properties, which offers the user a so-called "second source", thereby making purchasing more flexible and ensuring supply.

Despite the differing housing dimensions, both transducer types may be accommodated in the same transducer chambers in the module housing in a form-fitting manner in that the transducer chamber has a suitable contour which is specifically adapted to these two housing dimensions so as to enable this. Depending on the particular type of transducer housing, this may be realized via a funnel-shape and/or corresponding webs or other special geometrical adaptations to the form of the transducer chambers, for example, which a person skilled in the art will formulate in detail based on the different transducer housings.

An optoelectronic connector has a connector housing. An internal printed circuit board is arranged therein and at least two optoelectronic modules of the above-mentioned type are arranged on the printed circuit board. This printed circuit board has traces, which are connected to at least one of the electrical connections of the optoelectronic transducers in an electrically conductive manner on the connection side in each case and which are connected to electrical plug contacts of a plug-in region of the connector in an electrically conductive manner on the plug-in side.

In particular, the connector housing may have a separate cable outlet for each of the optoelectronic modules.

An optoelectronic sub-distribution arrangement has a central optoelectronic connector of the above-mentioned type and multiple peripheral optoelectronic connectors, the peripheral connectors each having at least one, and in particular precisely one, optoelectronic module.

Sub-distribution arrangements are therefore also disclosed in which the peripheral connectors have precisely one optical module. This is particularly advantageous owing to the clear arrangement and the simple and cost-effective manufacturability.

However, sub-distribution arrangements are therefore also furthermore disclosed in which the peripheral connectors may have multiple optical modules, although the above-mentioned variant, in which the peripheral connectors have precisely one optoelectronic module, is favored owing to its simplicity and straightforward structure. In some cases, however, it may be that more complex sub-distribution arrangements, possibly even as a tree structure, are required. This variant may be particularly advantageous in this regard since these distribution arrangements are cascadable, i.e. a central connector of a further sub-distribution arrangement of the above-mentioned type may be connected again to such a peripheral connector so that a sub-distribution system with a complex sub-branched tree structure is created.

In a preferred configuration of the sub-distribution arrangement, the number of optoelectronic modules in the central optoelectronic connector corresponds to the number of all optoelectronic modules of all peripheral optoelectronic connectors which belong to this sub-distribution arrangement. Put simply, the central connector then has as many modules as the peripheral connectors of this sub-distribution arrangement combined.

In other respects, the peripheral connectors may have a design which is comparable to that of the central optoelectronic connector.

The optoelectronic sub-distribution arrangement furthermore has multiple optical cables, each having multiple, in particular eight, optical conductors, the optical conductors of a cable being connected to one of the optoelectronic modules of the central optoelectronic connector in each case on the one hand and to the optoelectronic module of one of the peripheral connectors—or possibly to one of the optoelectronic modules of one of the peripheral connectors—on the other.

In particular, each of the optoelectronic modules of the at least one central optoelectronic connector here may be connected to precisely one optoelectronic module of one of the associated peripheral optoelectronic connectors in each case via a respective optical cable.

Put simply, this means that, in an advantageous configuration, one optical module of the central connector may always be connected to precisely one optical module of a peripheral connector via precisely one optical cable. By way of example, the central connector may have three modules, each of which is connected to a respective peripheral connector, which has only one module, via an optical cable. This sub-distribution arrangement then has a central connector and three peripheral connectors. An easily understandable, simply constructed, easily assembled and ergonomically manufacturable solution/sub-distribution arrangement is thus enabled. It can be easily recognized that this design is very clearly laid out and is highly unsusceptible to errors during its construction.

As already indicated, an optoelectronic sub-distribution system is also disclosed hereby. The sub-distribution system has multiple sub-distribution arrangements of the above-mentioned type.

In a first configuration, these may be connected to one another in the above-mentioned tree structure.

Alternatively or additionally, multiple sub-distribution arrangements in a sub-distribution system may also be operated in parallel. In an expedient configuration, multiple sub-distribution arrangements may be connected to one another to form a common cable harness, e.g. using cable ties. There are then multiple central optoelectronic connectors in the sub-distribution system, which are operated in parallel. Furthermore, for each of these central connectors, there are multiple peripheral connectors in each case, which are each connected to this central connector via an optical cable or at least via optical conductors.

In a further advantageous configuration, such an optoelectronic module may be arranged on a conventional printed circuit board, for example a printed circuit board of an electronic device, in order to connect the optical conductors to the printed circuit board electronics in a convenient manner. The electronic device may thus also receive an optical interface which can be mounted in a particularly advantageous manner.

BRIEF DESCRIPTION OF THE DRAWINGS

An exemplary embodiment of the invention is illustrated in the drawings and will be explained in more detail below

DETAILED DESCRIPTION

The figures contain partially simplified, schematic illustrations. Identical reference signs are sometimes used for similar, but possibly not identical, elements. Different views of similar elements may be drawn to different scales.

Figure 1A:
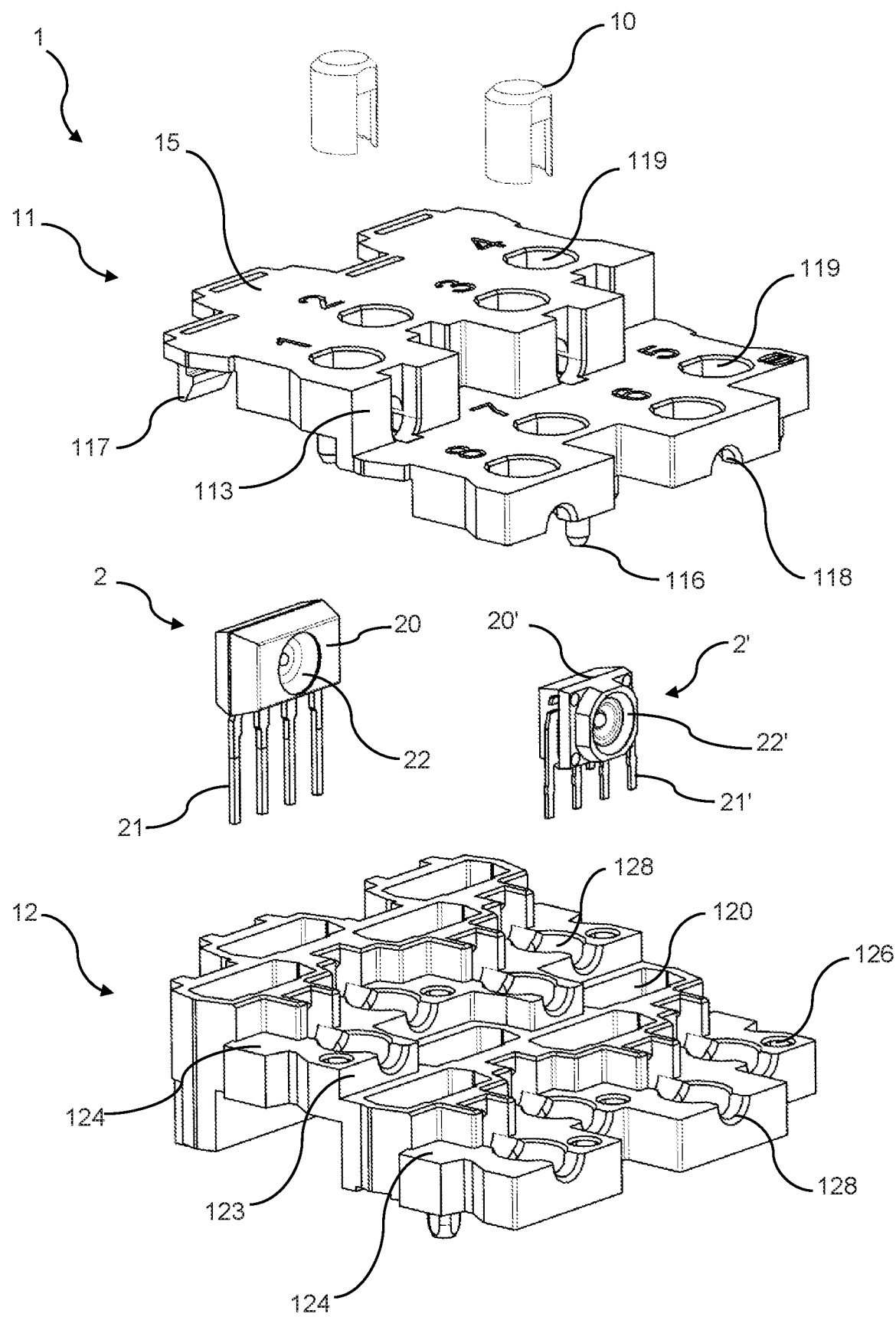
FIG. 1a and FIG. 1B show an optoelectronic module, each in an exploded illustration from two different viewing angles.
Figure 1B:
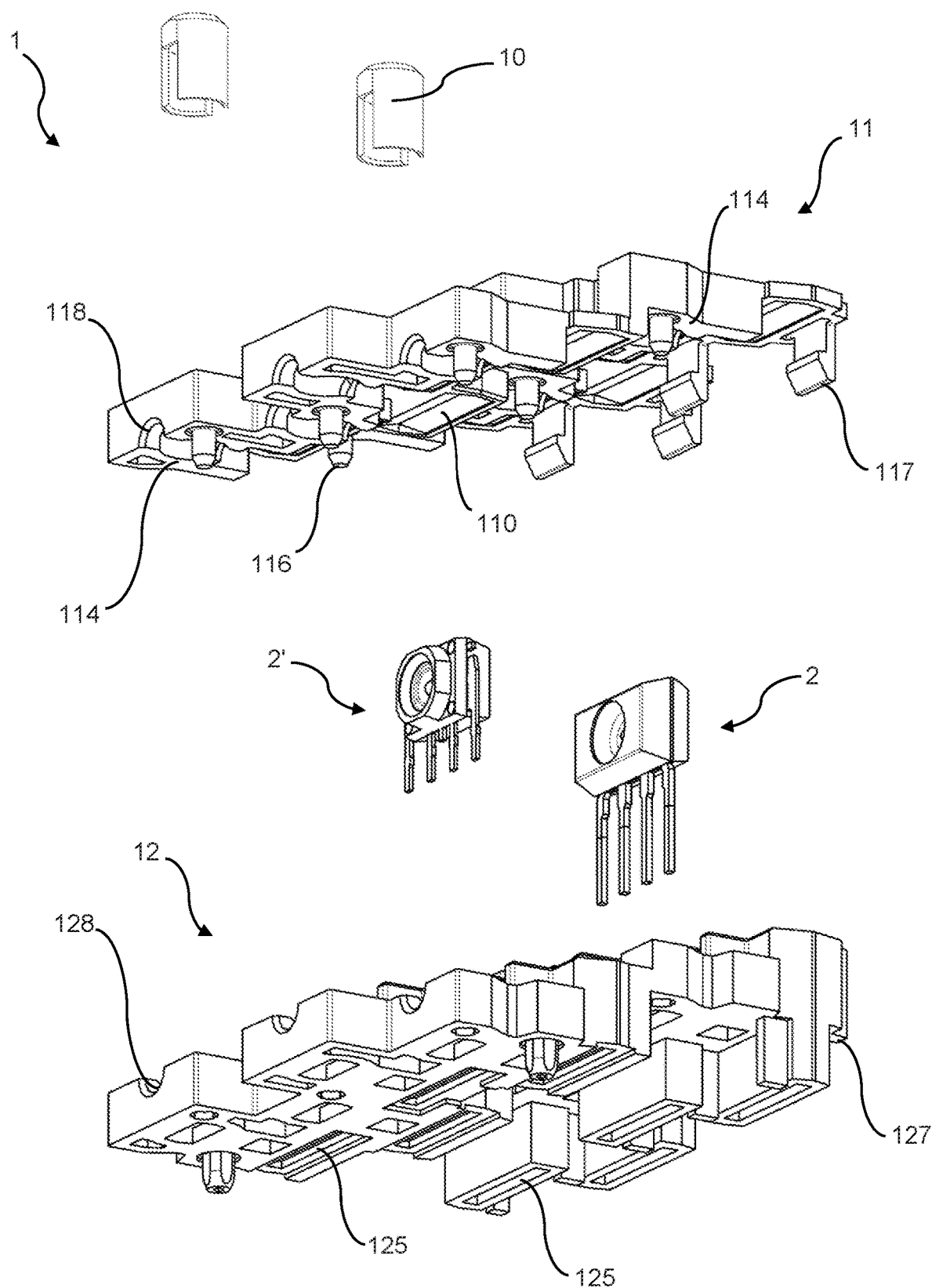

FIGS. 1a and 1b show an optoelectronic module 1 from two different viewing angles, each in an exploded illustration.

The optoelectronic module 1 has multiple optoelectronic transducers 2, 2' (defined in detail in FIG. 1a), which may differ in terms of their design.

The optoelectronic transducers 2, 2' each have a transducer housing 20, 20' with internal transducer electronics arranged therein, as well as the electrical connections 21, 21', which are connected to the transducer electronics in an electrically conductive manner and project out of the transducer housing 20, 20'. The optoelectronic transducers 2, 2' furthermore each have an optical connection 22, 22', which is arranged in the transducer housing 20, 20' and may receive and/or emit light through a window in a housing wall of the transducer housing.

The optoelectronic module 1 has a module housing 100, which is constructed in two parts and consists of a housing upper part 11 and a housing lower part 12.

Transducer chambers 120, into which the optoelectronic transducers 2, 2' can be inserted in a form-fitting manner, are arranged in the housing lower part 12. It is irrelevant here whether the transducer housings 20, 20' of different transducers 2, 2' may have different housing forms, since the transducer chambers 120 of the housing lower part 12 are adapted to multiple transducer housings 20, 20' and are therefore suitable for accommodating the different transducer housings 20, 20' in a form-fitting manner.

At a lower end, which is provided for contact with the printed circuit board 4, the transducer chambers 120 each have a contact lead-through opening 125 (shown and defined in FIG. 1B) in order for the electrical connections 21, 21' of the transducers 2, 2' to pass through and make contact with a printed circuit board 4.

The housing upper part 11 can be latched to the housing lower part 12 by means of latching hooks 117 on a latching edge 127 of this housing lower part 12. The housing upper part 11 furthermore has guide pins 116 and the lower part has guide cutouts 126, whereby the joining of the two housing parts 11, 12 is facilitated. The upper housing part 11 and the lower housing part 12 each have a common contact surface 114, 124 with which they are connected to one another in the joined-together state.

Part of a cable channel is formed in this common contact surface in each case, namely an upper part 118 of the cable channel 18 is formed in the upper housing part 11 and a lower part 128 of the cable channel is formed in the lower housing part 12.

The upper housing part 11 furthermore has a cable securing cutout 19 for each cable channel 18, which connects the upper side 15 of the said housing upper part to the upper part of the cable channel 118. To this end, the optoelectronic module 1 has a cable securing element 10 in each case, which can be inserted into this cable securing cutout 119 in a form- and force-fitting manner in order to secure an inserted optical conductor 58 in the cable channel 18 with strain relief.

The upper housing part 11 furthermore has an outer step 113 and the lower housing part has an inner step 123.

Figure 2A:
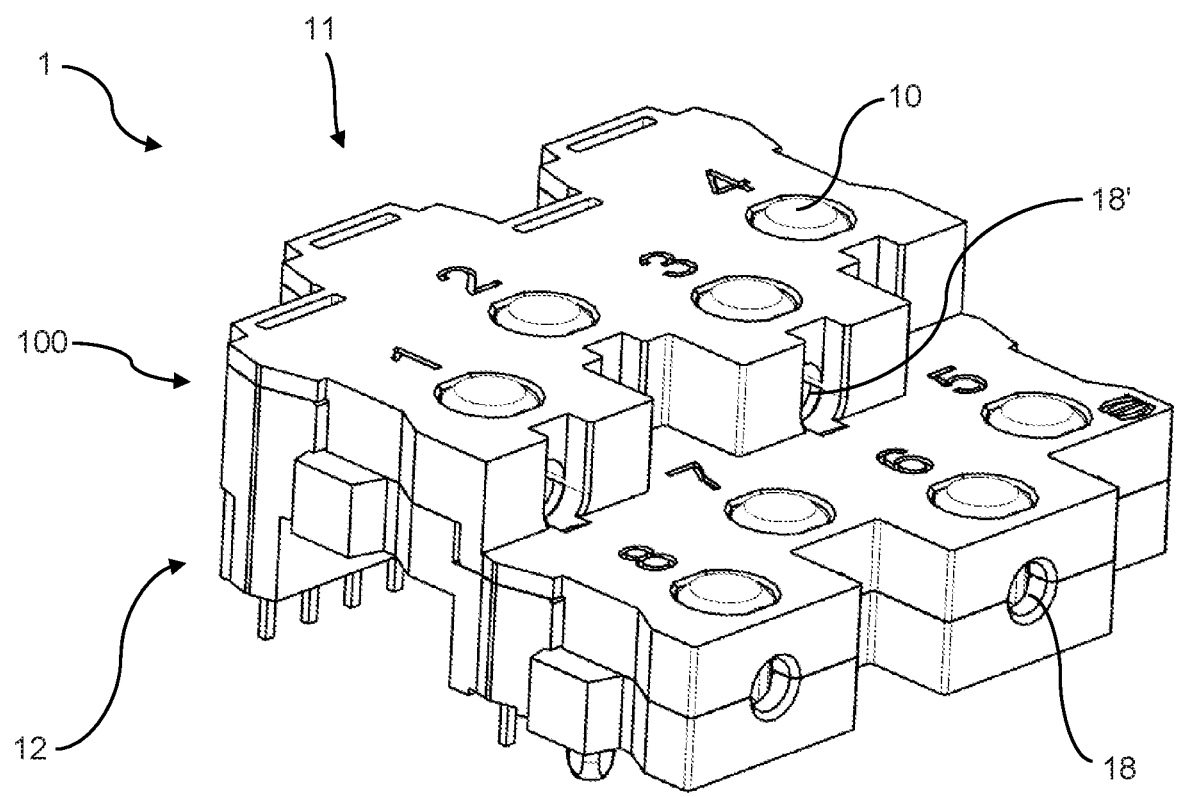
FIG. 2a and FIG. 2b show the assembled optoelectronic module from the two different viewing angles.
Figure 2B:
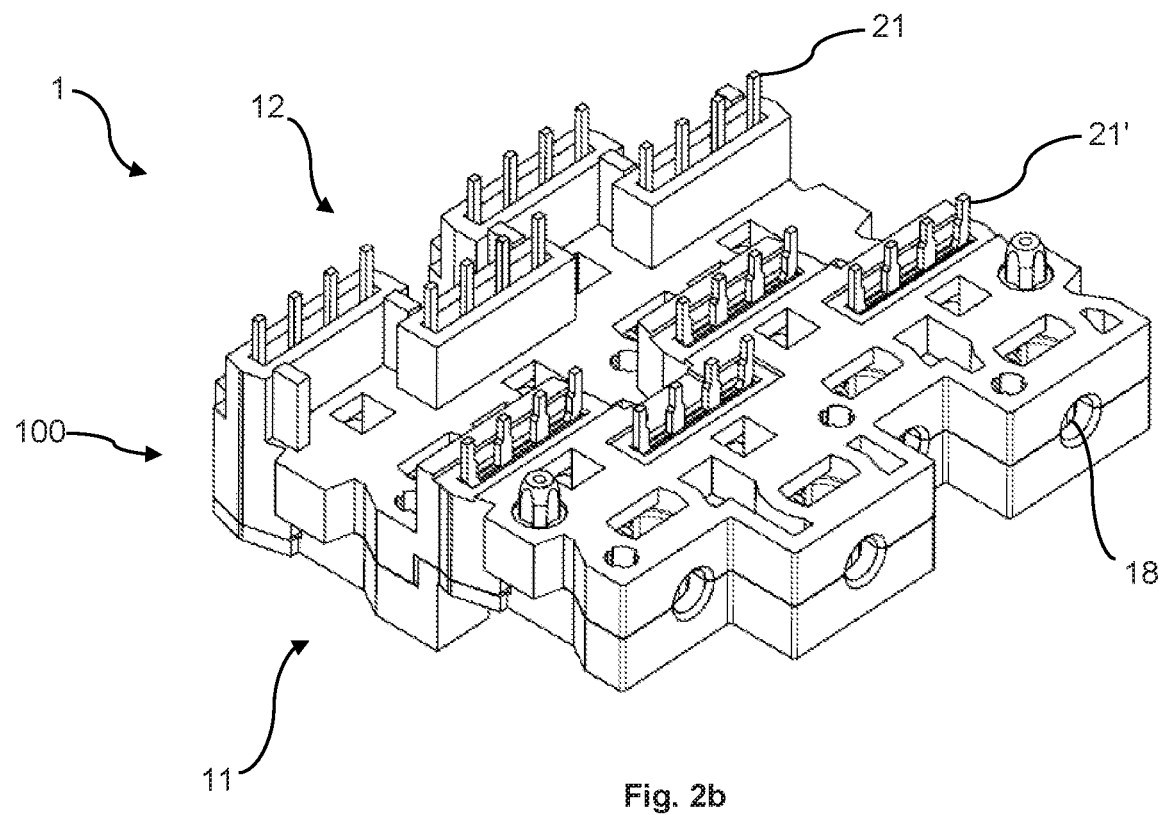

The significance of these steps 113, 123 can be seen from FIGS. 2a and 2b. These show the assembled optoelectronic module 1 from the two different viewing angles. In this case, the two housing parts 11, 12 together form the module housing 100. A total of eight optoelectronic transducers 2, 2' are installed in the module housing 100.

Both the transducers 2, 2' and the cable channels 18, 18' here are distributed over two different planes, which are arranged offset from one another by at least a cable channel diameter as a result of the stepped design. It can be easily recognized that a higher packing density is achieved as a result. The manual insertion of the optical conductors 51 and the securing thereof by the cable securing elements 10 during mounting is also facilitated.

It can be seen particularly clearly in FIG. 2b how the electrical connections 21, 21' of the optoelectronic transducers 2, 2' pass through the contact lead-through openings 125 of the lower housing part 12 and project out of this for connection to a printed circuit board 4.

Figure 3A:
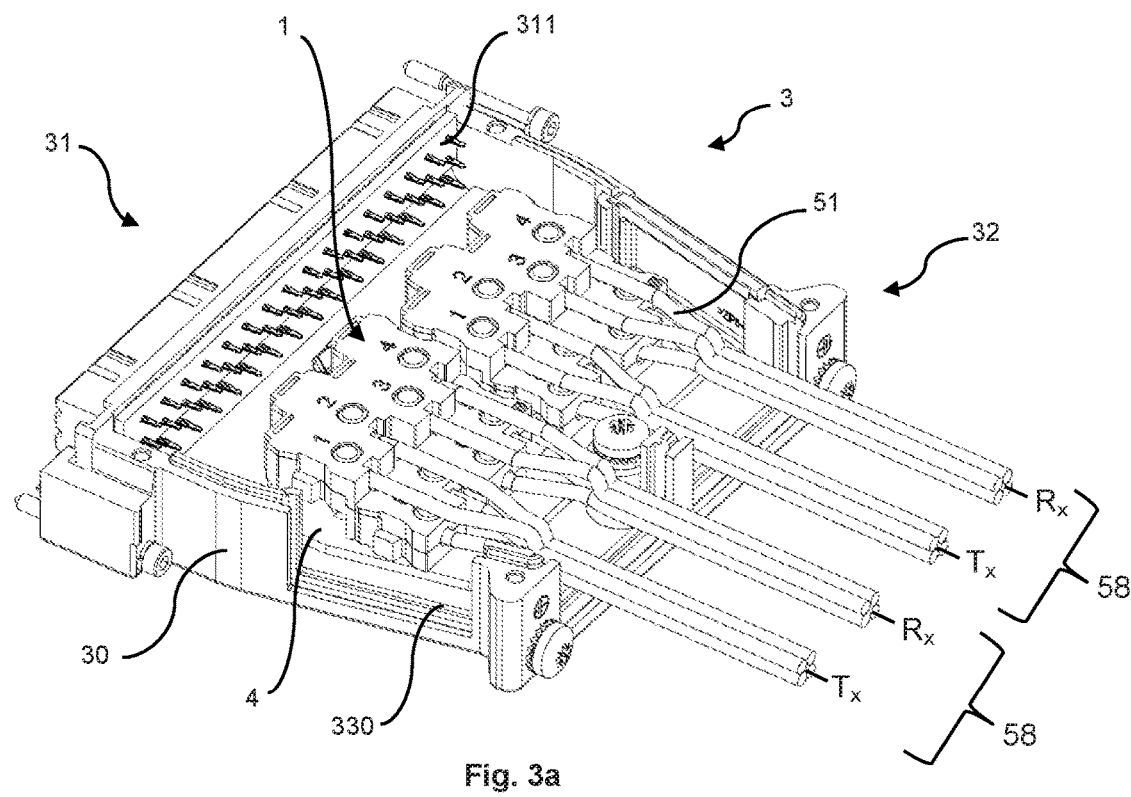
FIGS. 3a-d show a connector having a housing and two optoelectronic modules.

This printed circuit board 4, which is namely a component of an optoelectronic connector 3 and is arranged in the housing 30 thereof, can firstly be seen in FIG. 3a with a restricted view of its mounting surface (not defined explicitly for reasons of clarity). On the said mounting surface of the printed circuit board 4, two optoelectronic modules 1 are arranged and connected to the electrical connections 21, 21' of its optoelectronic transducers 2, 2' in an electrically conductive manner.

The connector 3 has a plug-in region 31 with plug contacts 311, which are likewise connected to the printed circuit board 4 in an electrically conductive manner, i.e. plugged into the printed circuit board 4. However, this connection/plugging-in is not illustrated in the drawing for reasons of clarity.

The connector 3 furthermore has a cable connection region 32. Two cable outlets 320 are arranged therein. A respective optical cable 58 passes through each cable outlet 320. Each cable has eight optical conductors 51, four conductors 51 being grouped together in each case to form a bundle. One of these is defined by Tx. Its optical conductors are each provided for connection to those optoelectronic transducers 2, 2' which are designed as transceivers (Tx). These transceivers (Tx) convert electrical signals of the plug contacts 311 into optical signals which they transmit to the optical conductors 51, connected thereto in each case, via their optical connection 22, 22'. The other bundle is defined by Rx and is provided in each case for connection to those optoelectronic transducers 2, 2' which are designed as receivers (Rx). The receivers (Rx) convert optical signals of the respectively connected optical conductors 51 into electrical signals which they transmit to the respective plug contacts 311 via the printed circuit board 4 via their electrical connections 21, 21'. There are therefore four supply lines and four return lines for each cable 58. The housing 30 moreover has a display window 330, which is still open in this illustration.

Figure 3B:
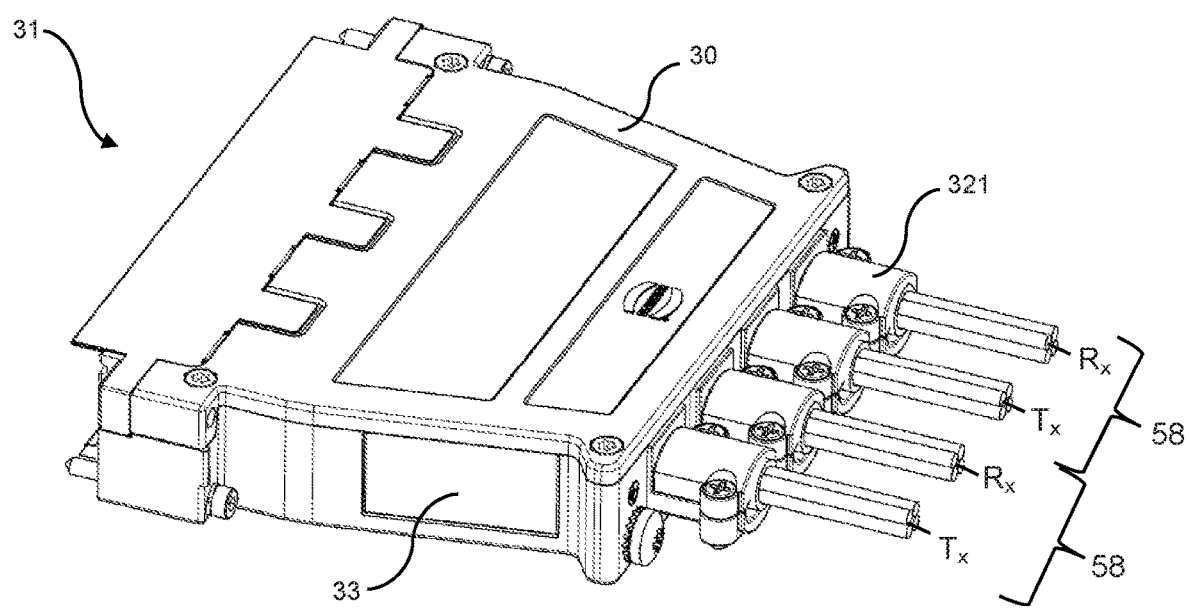

FIG. 3b shows the connector 3 having the housing 30, which has been closed by a housing cover (not defined in more detail). The arrangement shown here furthermore differs from that shown in the previous illustration in that the cable outlets 32 are closed by cable glands 321, each cable gland 321 relieving the strain on a bundle of conductors which passes through it. The display window 330 is moreover closed by a dummy panel 33.

Figure 3C:
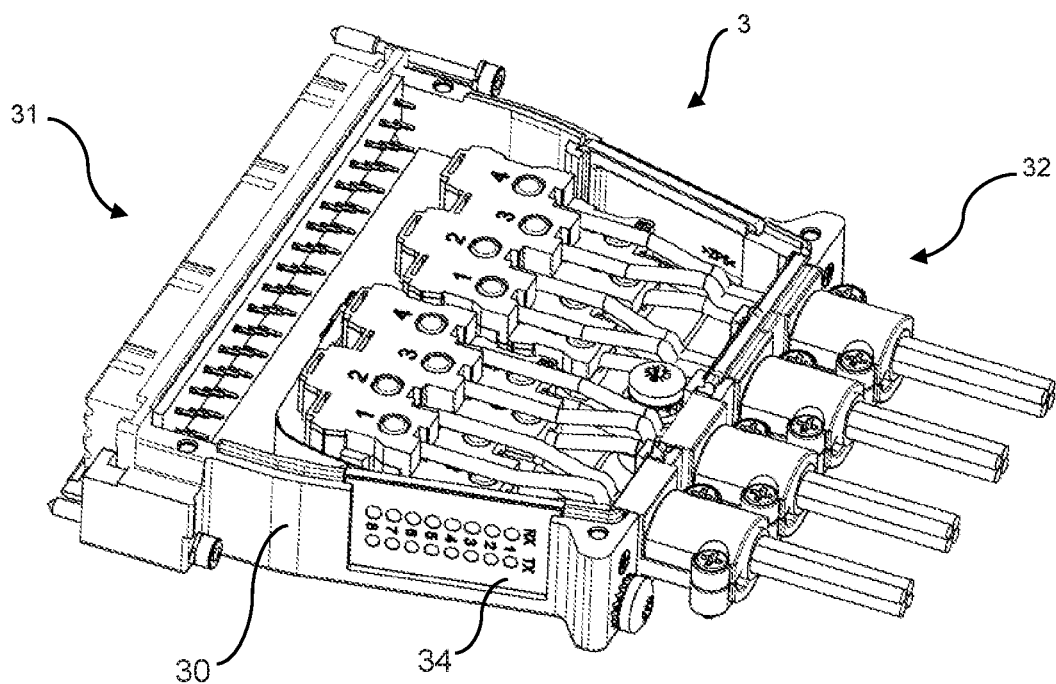
Figure 3D:
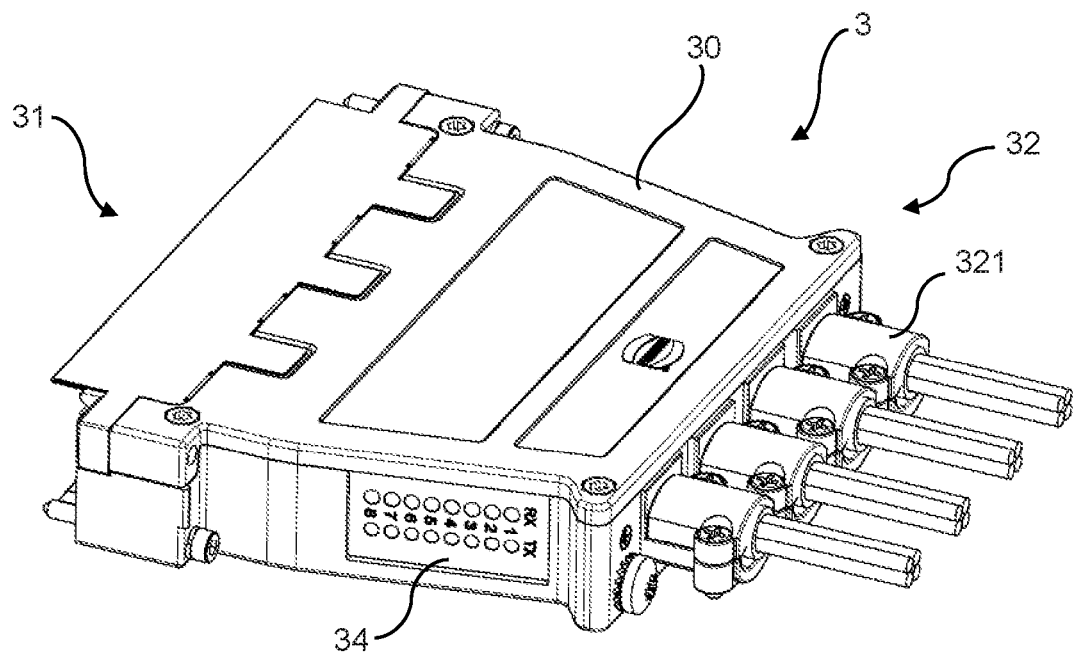

This arrangement is modified for the connector 3 in the open state in FIG. 3c and in the closed state in FIG. 3d in that, instead of the above-mentioned dummy panel 33, a status display 34, having a respective LED (light emitting diode) for each optical conductor 51/each electro-optical transducer 2, 2', is arranged in the display window 300. As soon as signals are then transmitted via the respective optical conductors 51 or the optoelectronic transducers 2, 2' connected thereto, the corresponding LED lights up to indicate this signal flow. To this end, the status display 34 is connected to the printed circuit board 4, from which 4 it 34 receives the corresponding electrical signals.

Figure 3E:
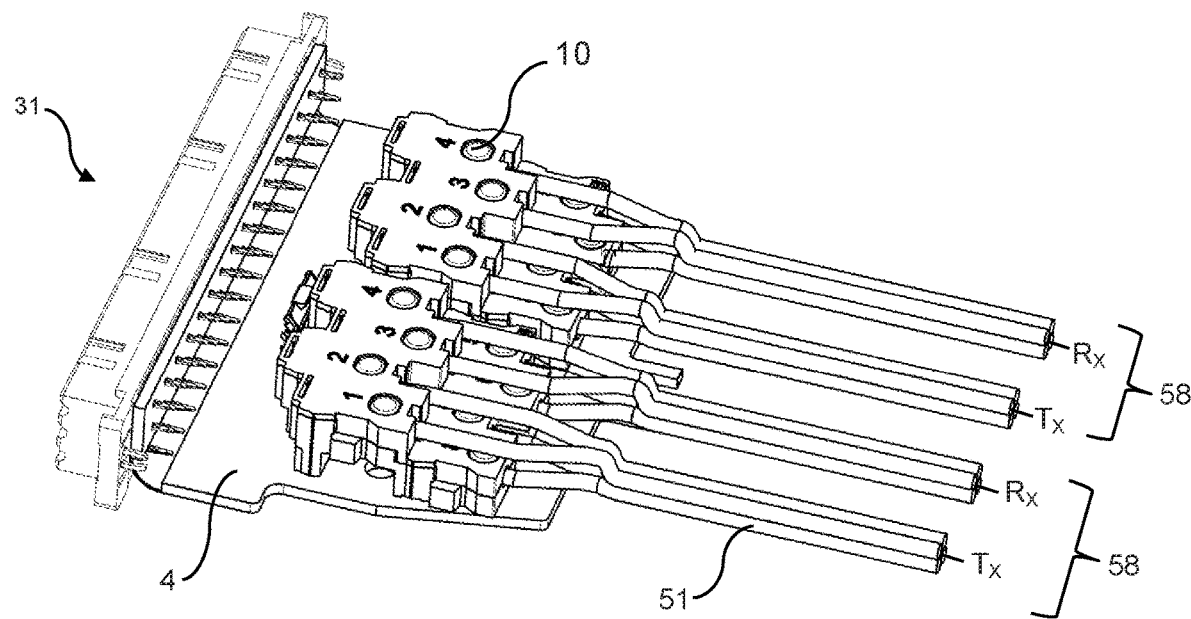
FIG. 3e and FIG. 3f show the connector without a housing.
Figure 3F:
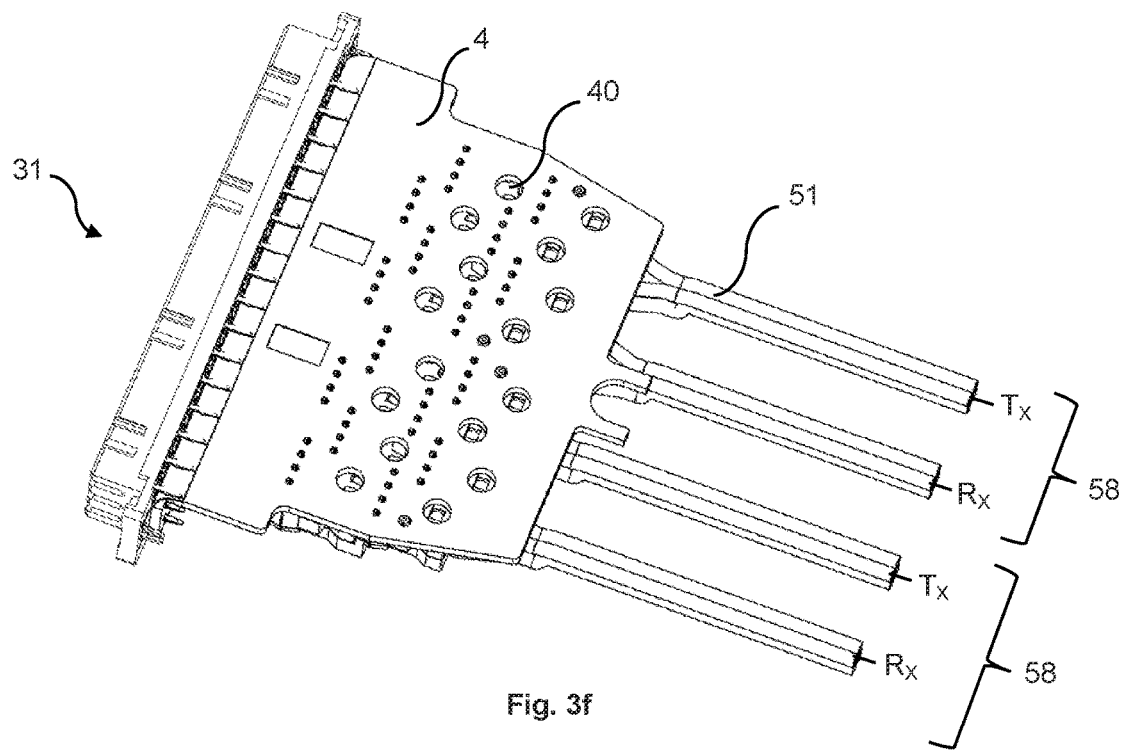

FIGS. 3e and 3f show a similar arrangement to FIG. 3a, albeit without the connector housing 30, from two different views.

The printed circuit board 4 can be seen particularly clearly in this illustration. In particular, FIG. 3f enables a view of an underside (likewise not defined in more detail for reasons of clarity) of the printed circuit board 4, which is opposite its above-mentioned mounting surface. Separation openings 40 are arranged in the printed circuit board 4. By means of these separation openings 40, securing elements 10 lying above them can be removed from the cable securing cutout 119 of the module housing 100 using a tool, e.g. a pointed object, for example an electric screwdriver or the like.

Figure 4A:
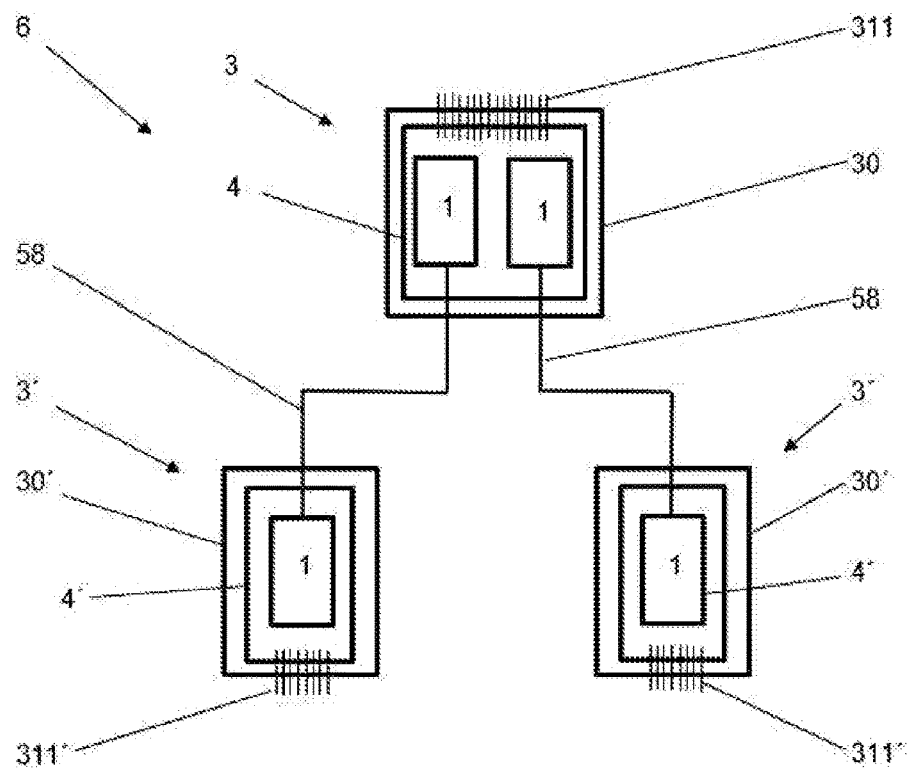
FIG. 4a and FIG. 4b show two different optoelectronic sub-distribution arrangements.

FIG. 4a shows a first embodiment of an optoelectronic sub-distribution arrangement 6 in a schematic illustration.

This first sub-distribution arrangement 6 has a conceivably simple form and is formed by a central connector 3 of the above-mentioned type and two peripheral connectors 3', which differ from the central connector 3 in that they only have one optoelectronic module 1 in each case. The central connector 3 therefore has the exact same number of optoelectronic modules 1 as the peripheral connectors combined. The modules 1 of the peripheral connectors are each arranged on a printed circuit board 4', which only has eight traces in this embodiment (although it goes without saying that any other number is also possible). Accordingly, each of the peripheral conductors also only has eight plug contacts 311' in this example. On the cable connection side, the central connector 3 is connected at one of its optoelectronic modules 1 in each case to a respective optoelectronic module 1 of one of the peripheral connectors 3' via a respective optical cable 58, which accordingly has eight conductors.

This embodiment has the advantage that its design is particularly clearly laid out and is unsusceptible to errors and therefore enables very simple mounting.

Figure 4B:
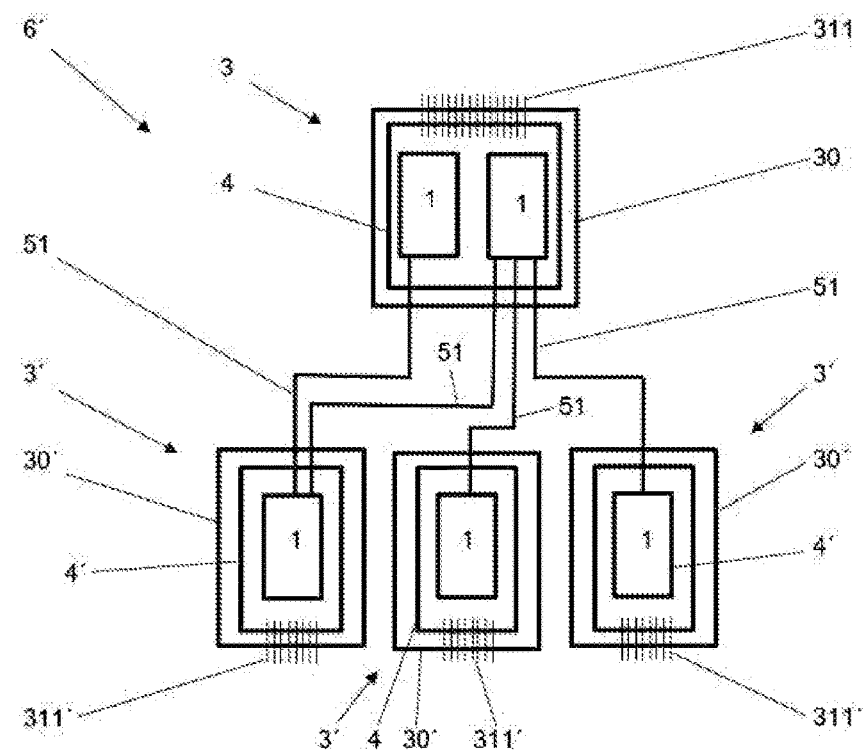

FIG. 4b shows a second sub-distribution arrangement 6' having one central 3 and three peripheral connectors 3'.

It can be seen from this illustration that the number of optoelectronic modules of the peripheral connectors 3' does not necessarily have to correspond to the number of optoelectronic modules 1 of the central connector 3. Instead, the optoelectronic transducers 2, 2' of these modules 1 may also be freely connected to one another as required via individual optical conductors 51.

This embodiment offers the advantage of enabling maximum flexibility for the assignation of the plug contacts 311, 311', whilst offering simpler mounting compared to the prior art.

The optoelectronic modules 1 of the central 3 and the peripheral 3' connectors may be identical in both embodiments.

Even where combinations of different aspects or features of the invention are shown in the figures in each case, it is clear to a person skilled in the art—unless indicated otherwise—that the combinations shown and discussed are not the only possible combinations. In particular, mutually corresponding units or feature complexes from different exemplary embodiments may be interchanged with each other.

LIST OF REFERENCE SIGNS

1 Optoelectronic module
10 Securing element
18, 18' Cable channels
100 Module housing
11 Housing upper part
110 Transducer cutout
133 Outer step
114 Common contact surface (of the housing upper part)
115 Upper side
116 Guide pins
117 Latching hooks
118 Upper part of the cable channel
119 Cable securing cutout
12 Housing lower part
120 Transducer chamber
12 Inner step
124 Common contact surface (of the housing lower part)
125 Contact lead-through opening
126 Guide cutouts
127 Latching edge
128 Lower part of the cable channel
2, 2' Optoelectronic transducer
20, 20' Transducer housing
21, 21' Electrical connections
22, 22' Optical connections
3 (Central) connector
3' Peripheral connector
30, 30' Connector housing
31 Plug-in region
311, 311' Plug contacts
32 Cable connection region
320 Cable outlet
321 Cable gland
33 Dummy panel
330 Display window
34 Status display
4, 4' Printed circuit board (inside the connector)
40 Separation opening
51 Optical conductor
58 Optical cable
Rx Transceiver (supply line)
Tx Receiver (supply line)
6 Optoelectronic sub-distribution arrangement

The invention claimed is:

1. An optoelectronic module (1), comprising:
multiple optoelectronic transducers (2, 2'), having
a transducer housing (20) with internal transducer electronics arranged therein,
electrical connections (21, 21'), which are connected to the internal transducer electronics in an electrically conductive manner and project out of the transducer housing (20), and
an optical connection (22), which is arranged in the transducer housing (20) and may receive and/or emit light through a window in a housing wall of the transducer housing (20); and
a module housing (100) for accommodating and collectively fastening the optoelectronic transducers (20) on a printed circuit board (4) and for connecting optical conductors (51) to the optical connections (22) of the transducers (2) and for strain-relieving the optical conductors, wherein
the module housing (100) is constructed in at least two parts and has
a housing upper part (11) and
a housing lower part (12), which can be connected and secured to said housing upper part, wherein
a lower end of the housing lower part (12) is configured for fastening the housing lower part (12) on the printed circuit board (4), and wherein
a respective transducer chamber (120) is arranged in the housing lower part (12) for accommodating each optoelectronic transducer (2) to be accommodated in a form-fitting manner, the respective transducer chambers (120) having one or more contact lead-through openings (125) at the lower end of the housing lower part (12) in order for the electrical connections (21, 21') of the optoelectronic transducer (20) to pass through and make electrical contact with the printed circuit board (4), and wherein
the housing upper part (11) and the housing lower part (12) each have part of a cable channel (118, 128) at their common contact surfaces (114) in each case, whereby
a complete cable channel (18) is formed in each case for feeding optical conductors (51) to the transducer chambers (120), and therefore to the respective optoelectronic transducers (2) arranged therein, after the housing upper part (11) and housing lower part (12) have been joined together,
wherein the multiple optoelectronic transducers (2, 2') include at least one upper optoelectronic transducer (2) and at least one lower optoelectronic transducer (2'),
wherein the optical connection (22) of the at least one upper optoelectronic transducer (2) is arranged in an upper plane and the optical connection (22') of the at least one lower optoelectronic transducer (2') is arranged in a lower plane, and
wherein the upper plane is arranged at a greater distance from the lower end of the housing lower part (12) than the lower plane.

2. The optoelectronic module (1) as claimed in claim 1, wherein the housing upper part (11) has a plurality of cable securing cutouts (119), including a respective cable securing cutout (119) for each cable channel (18), which extends from an upper side (15) of the housing upper part (11) and is connected to the upper part of the respective cable channel (118) and into which a securing element (10) can be inserted in each case in order to ensure that the respective optical conductor (51) is secured on the module housing (100) with strain relief.

3. The optoelectronic module (1) as claimed in claim 1, wherein the housing upper part (11) comprises guide pins (116) and latching hooks (117),
wherein the housing lower part (12) comprises guide cutouts (126) and a latching edge (127), and
wherein the housing upper part (11) and the housing lower part (12) of the module housing (100) can be fastened to one another by latching in that the guide pins (116) engage the guide cutouts (126) and the latching hooks (117) engage the latching edge (127).

4. The optoelectronic module (1) as claimed in claim 1, wherein the upper plane is arranged offset from the lower plane by at least a thickness of the cable channel (18, 18').

5. The optoelectronic module (1) as claimed in claim 1, wherein, according to their internal transducer electronics, at least some of the optoelectronic transducers (2, 2'') are transceivers ("Tx") and their optical connection (22) is designed to emit light.

6. The optoelectronic module (1) as claimed in claim 1, wherein, according to their internal transducer electronics, at least some of the optoelectronic transducers (2, 2') are receivers ("Rx") and their optical connection (22, 22') is designed to receive light.

7. The optoelectronic module (1) as claimed in claim 4, wherein the transducer housings (20) of all optoelectronic transducers (2, 2') arranged in the module housing (100) have the same housing dimensions.

8. The optoelectronic module (1) as claimed in claim 1, wherein at least two of the optoelectronic transducers (2, 2') arranged in the module housing (20) have mutually different transducer housings (20, 20') with different housing dimensions.

9. An optoelectronic connector (3), comprising:
a connector housing (30);
a printed circuit board (4) arranged in the connector housing (30); and
at least two optoelectronic modules (1) as claimed in claim 1 arranged on the printed circuit board,
wherein the printed circuit board (4) has electrical traces, which are connected to at least one of the electrical connections (21, 21') of the optoelectronic transducers (2, 2') in an electrically conductive manner on a connection side in each case and which are connected to electrical plug contacts (311) of a plug-in region (31) of the connector (3) in an electrically conductive manner on a plug-in side.

10. The optoelectronic connector (3) as claimed in claim 9, wherein the connector housing (30) provides a separate cable outlet (320) for each of the optoelectronic modules (1).

11. An optoelectronic sub-distribution, comprising:
a central optoelectronic connector (3) comprising
a connector housing (30),
a printed circuit board (4) arranged in the connector housing (30), and
at least two optoelectronic modules (1) as claimed in claim 1 arranged on the printed circuit board,
wherein the printed circuit board (4) has electrical traces, which are connected to at least one of the electrical connections (21, 21') of the optoelectronic transducers (2, 2') in an electrically conductive manner on a connection side in each case and which are connected to electrical plug contacts (311) of a plug-in region (31) of the connector (3) in an electrically conductive manner on a plug-in side; and
multiple peripheral optoelectronic connectors (3'), which each have at least one optoelectronic module (1) as claimed in claim 1; and
multiple optical cables (58), each having multiple optical conductors (51),
wherein the optical conductors (51) of each of the optical cables (58) are connected to the optical connection (22, 22') of an optoelectronic transducer (2, 2') of one of the optoelectronic modules (1) of the central optoelectronic connector (3) and to the optical connection (22, 22') of one of the optoelectronic transducers (2, 2') of an optoelectronic module (1) of one of the peripheral optoelectronic connectors (3).

12. The optoelectronic sub-distribution as claimed in claim 11,
wherein a number of optoelectronic modules (1) in the central optoelectronic connector (3) corresponds to a number of all optoelectronic modules (1) of all peripheral connectors (3') belonging to this sub-distribution arrangement.

13. The optoelectronic sub-distribution as claimed in claim 11,
wherein each of the optoelectronic modules (1) of the central optoelectronic connector (3) is connected to precisely one optoelectronic module (1) of a peripheral optoelectronic connector in each case via a respective optical cable (58).

14. The optoelectronic sub-distribution as claimed in claim 11,
wherein each of the peripheral optoelectronic connectors has precisely one optoelectronic module (1).

15. An optoelectronic sub-distribution system, having multiple optoelectronic sub-distributions as claimed in claim 11.

16. The optoelectronic module (1) as claimed in claim 1, wherein the electrical connections (21) of the at least one upper optoelectronic transducer (2) are longer than the electrical connections (21') of the at least one lower optoelectronic transducer (2').

17. The optoelectronic module (1) as claimed in claim 1, wherein a front end of a lower cable channel (18) leading to the at least one lower optoelectronic transducer (2') is arranged in front of a front end of an upper cable channel (18') leading to the at least one upper optoelectronic transducer (2).

* * * * *